United States Patent
Sprokel

[11] 3,882,039
[45] May 6, 1975

[54] ADDITIVE FOR LIQUID CRYSTAL MATERIALS

[75] Inventor: Gerard J. Sprokel, Fishkill, N.Y.

[73] Assignee: International Business Machines Corporation, Armonk, N.Y.

[22] Filed: June 21, 1973

[21] Appl. No.: 372,120

[52] U.S. Cl. ...... 252/299; 252/408 LC; 350/160 LC
[51] Int. Cl... C09k 3/00; G01n 31/00; G01n 33/00; G02f 1/28; G02f 1/36
[58] Field of Search ...... 252/408 LC, 299; 350/150, 350/160 LC; 230/130 LC

[56] References Cited
UNITED STATES PATENTS

| | | | |
|---|---|---|---|
| 3,656,834 | 4/1972 | Haller et al. | 252/408 LC |
| 3,698,449 | 10/1972 | Sorkin et al. | 350/160 LC |
| 3,803,050 | 4/1974 | Haas et al. | 350/160 LC |
| 3,814,700 | 6/1974 | Aviram et al. | 252/408 LC |
| 3,816,113 | 6/1974 | Haas et al. | 252/408 LC |
| 3,816,533 | 6/1974 | Brandstrom et al. | 252/408 LC |

Primary Examiner—Benjamin R. Padgett
Assistant Examiner—T. S. Gron
Attorney, Agent, or Firm—Wolmar J. Stoffel

[57] ABSTRACT

A nematic liquid crystal composition comprised of a nematic material having dissolved therein an additive to provide increased frequency response having the formula $(C_6H_5-CH_2)_2(R)_2N^+X^-$ wherein R is selected from the group consisting of methyl and ethyl radicals, and $X^-$ is selected from the group consisting of $Cl^-$, $Br^-$, and $I^-$.

12 Claims, 10 Drawing Figures

ADDITIVE FOR LIQUID CRYSTAL MATERIALS

BACKGROUND OF THE INVENTION

This invention relates to liquid crystal optical displays and, more particularly, to novel liquid crystal compositions that include a nematic material having dissolved therein an additive to provide increased frequency response, and to liquid crystal displays utilizing the composition.

A relatively recent development in the field of display elements, commonly known as a liquid crystal display device, is becoming increasingly important. Such devices have a relatively simple structure which consists basically of two spaced plates, at least one of which is transparent, an organic, nematic mesomorphic compound confined between the plates, and conductive electrodes on the inside facing sides of the plates which are arranged to depict indicia by selectively utilizing various combinations of the segments. A voltage source, preferably AC, is arranged to apply an electric field between the sets of electrodes within the chamber formed between the plates. Application of an electric field influences the liquid crystal compound and thereby changing its light or reflective characteristics. Liquid crystal displays have been utilized in many applications, particularly pocket size calculators, wristwatches, multimeters, and various other electronic instrumentations. The advantage of such displays is that they can be directly driven off integrated circuit chips because they require little power and operate at relatively low supply voltages, usually between fifteen and thirty volts.

The majority of liquid crystal displays utilize the effect of "dynamic scattering." "Dynamic scattering" is the well-known phenomenon of the scattering of light by the turbulent motion of nematic liquid crystals in an electric field. With no applied field, the liquid crystals assume their crystalline alignment and are essentially transparent to light. When an electric field is applied, the liquid crystals become milky, white and opaque. Indicia can be produced in devices by arranging electrodes in segments or blocks and selectively activating the desired segments to produce the visible regions by "dynamic scattering."

SUMMARY OF THE INVENTION

It is therefore an object of this invention to provide an improved electro-optical element.

Another object of this invention is to provide an improved additive for nematic materials utilized in liquid crystal displays.

Yet another object of this invention is to provide an additive for liquid crystal elements having a negative dielectric anisotropy that provides electrical conductivity to the resultant composition which will result in greater contrast due to an increase in light scattering turbulence.

These and other objects of the invention are accomplished by providing in an electrical optical display device having first and second spaced plates, a liquid crystal composition confined between the plates, electrodes on the plates to define a segmented indicia configuration, the improvement comprising a nematic liquid crystal composition that includes a nematic material having dissolved therein an additive to provide electrical conductivity having the formula $(C_6H_5—CH_2)_2 (R)_2N^+X^-$ wherein R designates methyl or ethyl radicals, and the $X^-$ is a halogen ion. Alternatively, choline chloride can be used as an additive.

BRIEF DESCRIPTION OF THE DRAWINGS

The foregoing and other objects, features and advantages of the invention will be apparent from the following more particular description of preferred embodiments of the invention as illustrated in the accompanying drawings wherein.

DESCRIPTION OF THE PREFERRED EMBODIMENTS

Figure 1:
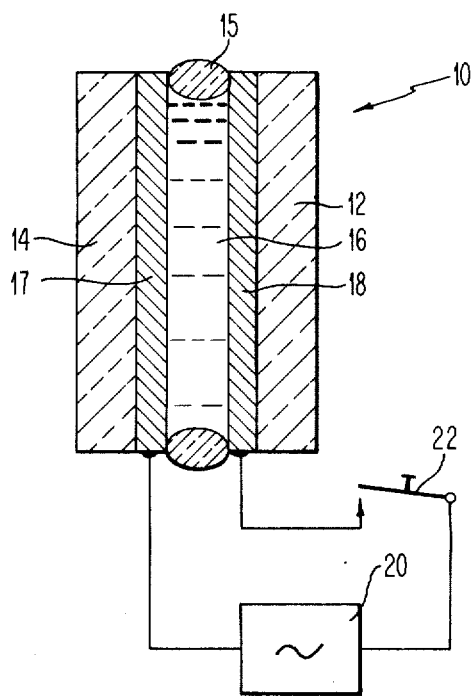
FIG. 1 is a schematic depiction of a liquid crystal display element incorporating the liquid crystal composition according to the invention.

Referring now to FIG. 1 of the drawings, there is depicted schematically the essential elements of a liquid crystal display device. Liquid crystal display device 10 has two plates 12 and 14 that are spaced from each other and sealed at the periphery by seal 15 to define an enclosed space 16. At least one of the plates 12 and 14 is transparent. Conductive electrodes 17 and 18 are provided on the inside facing surfaces of plates 12 and 14. The electrodes are made of a suitable conductive material such as $SnO_2$, or the like. Preferably, the electrodes are made of a transparent material. A source 20 of alternating current is provided to apply an electric field across electrodes 17 and 18 in space 16 when switch 22 is closed. Disposed within the enclosed space 16 is a nematic liquid crystal composition with anisotropic properties. While there are three general types of liquid crystal phases, namely nematic, cholesteric and smectic, the invention is concerned primarily with nematic materials capable of "dynamic scattering" of light. "Dynamic scattering" will occur if the nematic liquid crystal has a negative dielectric anisotropy. This means that the perpendicular component of the electrical dipole moment of the molecule is larger than the parallel component of the electrical dipole moment. Since an electric dipole generally tries to line up parallel to an applied field, nematic molecules having negative dielectric anisotropy will line up generally perpendicular to or across the applied field. Electrical conduction through the crystals between electrodes 17 and 18 is a necessary condition for "dynamic scattering," for it is this interaction of charge carriers and the dipole moment of the nematic liquid crystal molecule that gives rise to light scattering turbulence in the liquid crystal material. Pure nematic compounds have resistivities on the order of $10^{12}$ ohm-cm. and are not sufficiently conductive to give good contrast ratios in a display. Hence, a dopant is added to the pure nematic material to make it more conductive. To see any contrast at all, the resistivity of the material must be dropped below $10^{11}$ ohm-cm. Contrast ratios continue to improve as the resistivity is lowered but there is limit to this improvement. One benefit of operating at the lower resistivities is that the response time of the crystal is considerably shortened. A detrimental effect of the lower resistivity is that the current and therefore the power consumption increases and can become excessive, especially for battery-powered applications.

Typical examples of nematic materials are compounds such as p-methoxybenzylidene-p-butylaniline, more commonly known as MBBA, p-methoxybenzylidene-p-aminophenylacetate, p-azoxyanisol, and butyl-p-(p-ethoxyphenoxycarbonyl)-phenylcarbonate and p-ethoxybenzylidene-p-n-butylaniline, more commonly known as EBBA.

In producing "dynamic scattering" between the electrodes, an AC current is almost always utilized in order to prevent deterioration of the electrode material by electro-erosion. In general, the higher the frequency the longer the life of the electrodes. However, in going to higher frequency, the "dynamic scattering" effect is lost above what is commonly called a cut-off frequency. Further, when the frequency is low, it will produce a visible flicker in the dynamically scattered regions, which is objectionable.

The display device 10 in actual use and operation will include a plurality of opposed electrode segments capable of depicting the desired indicia. One conventional indicia configuration is a series of seven bars arranged in a figure eight configuration for depicting numerals. Alternately, a grid of blocks or dots can be used to depict either numerals or letters. The device 10, illustrated in FIG. 1, can consist of a single transparent plate in spaced relation to an opaque plate wherein the dynamically scattered regions of the device are illuminated by incident light. Alternately, both plates as well as electrodes can be transparent and a light provided opposite to the side being viewed to provide illumination of the activated regions. The particular configuration of the electrodes is well known and does not constitute part of the invention.

In this invention, additives are provided which are dissolved in the nematic liquid crystal material, having a negative dielectric anisotropy, which is designed to lower the resistivity and therefore the response time of the liquid crystals in the display. Lowering of the response time increases the contrast making the device more effective since it is easier to read. The additives of the invention permit operation of the device with significantly higher frequencies, as will become more apparent from the examples. Thus, the liquid crystal composition in the space 16 of device 10 will consist of a nematic liquid crystal material typically MBBA or EBBA, or mixtures thereof, containing an additive to increase the frequency response, which additive can be characterized by the formula $(C_6H_5—CH_2)_2 (R)_2N^+X^-$ where R is either a methyl or ethyl group and $X^-$ is a halogen. Alternatively, the additives can be choline chloride having the chemical formula

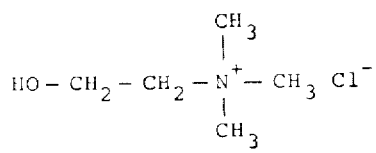

preferably in amounts sufficient to provide a resistivity in the range of $10^8$ ohm-cm.

In general, the additive is present in the liquid crystal composition preferably in an amount in the range of $0.56 \times 10^{-6}$ to $10.9 \times 10^{-6}$ mol/ml. The resulting composition will, in general, have a resistivity in the range of $5 \times 10^8$ to $1.5 \times 10^9$ ohm-cm. The maximum amount of additive is, in general, determined by the solubility of the additive in the nematic liquid. A most preferred concentration of additive in the nematic liquid is on the order of $1 \times 10^{-6}$ mol/ml which represents a reasonable compromise between increased frequency response and increased conductivity. The resulting composition has a resistivity on the order of $10^9$ ohm-cm.

The following examples are included to illustrate specific compounds and techniques for fabricating the device of the invention and are not intended to unduly limit same.

EXAMPLE I

Figure 2A:
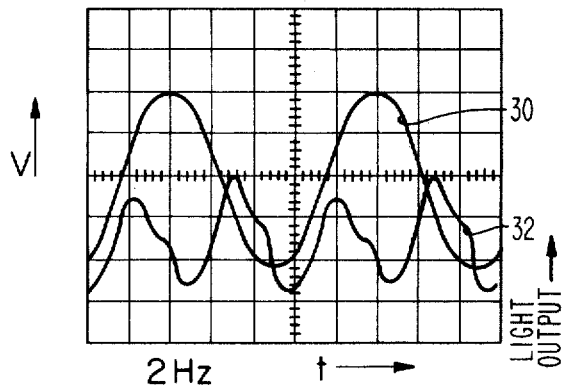
FIGS. 2A–2C, FIGS. 3A–3C and FIGS. 4A–4C are pictures of oscilloscope scans that point out and compare the nematic liquid crystal composition of the invention.
Figure 2B:
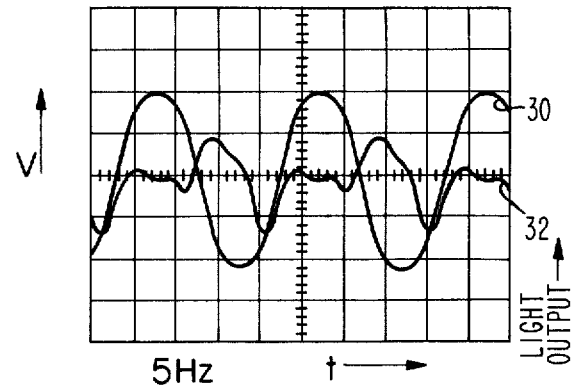
Figure 2C:
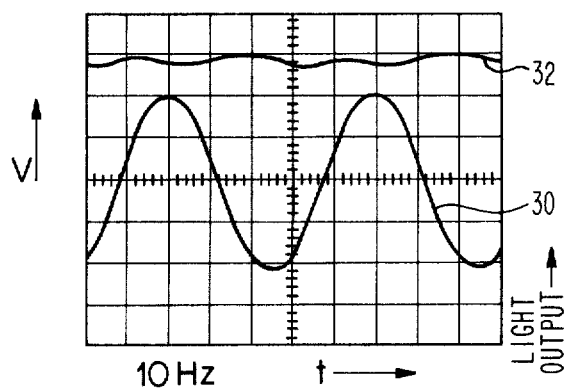

A pair of glass plates each measuring 1 inch wide and 2 inches long were cleaned and a layer of $SnO_2$ evaporated on the surfaces thereof. Utilizing standard photolithographic techniques, a pattern of $SnO_2$ was formed on each plate consisting of a relatively large circular area having a diameter of approximately three-eighths of an inch, joined to an elongated stripe terminating on the edge serving as the electrode. Two narrow strips of polyimide film of a thickness of 1 mil were placed on each pair of plates as spacing elements. Two plates were then placed in parallel spaced relationship with the large circular area electrodes in opposing relation and with the electrode stripes extending outwardly in opposed direction available for making electrical contact to a suitable AC source. A drop of N-(p-methoxybenzylidene)p-n-butylaniline, commonly known as MBBA, was placed on one of the plates in a position to be drawn by capillary action into the space between the two plates. The nematic liquid composition was drawn in by capillary action which completed fabrication of the experimental display cell. The cell was then placed on a stand with a light directed through the electrode area and a photoelectric sensing cell on the opposite side to detect the light. A variable AC current source was connected to the opposing electrodes of the cell and the output also connected to an oscilloscope. The output of the photoelectric cell was inputted to an oscilloscope and projected on the same screen as the AC source. The AC voltage applied was a sine wave voltage having a 40 volt peak to peak, which represented 14 volts RMS voltage. The frequency was varied and the pictures taken on the oscilloscope viewing tube. The pictures taken at 2 Hz, 5 Hz and 10 Hz are shown in FIGS. 2A, 2B and 2C. The large sine curve indicated at 30 depicts a single voltage cycle applied to the electrodes of the liquid crystal optic display. Curve 32 indicates the magnitude of the output of the photocell. The area under curve 32 represents the total amount of light passing through the liquid crystal display. It was arbitrarily decided that the average or mean of curve 32 must be beneath the center line in order to provide a useful, visible contrasting segment. As FIGS. 2A, 2B and 2C indicate, the liquid crystal cell using MBBA alone was capable of operation with a power source frequency of 2 Hz. FIG. 2B indicates that at a frequency of 5 Hz, the operation was marginal at best. FIG. 2C indicates that there is no appreciable contrast and that the cell was inoperative at frequency of 10 Hz.

EXAMPLE II

Figure 3A:
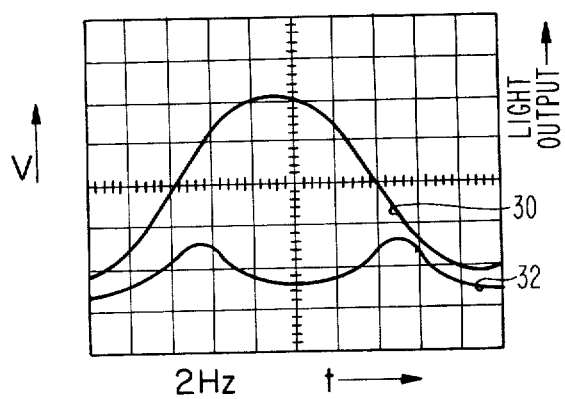
Figure 3B:
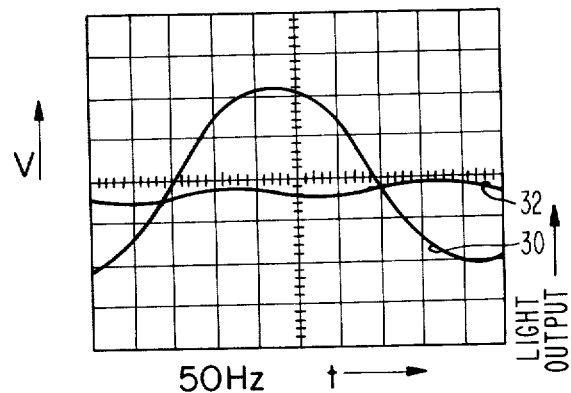
Figure 3C:
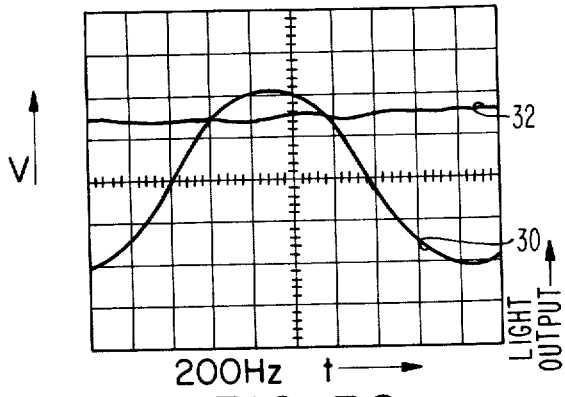

The procedure for forming the elements of the experimental liquid crystal display cell described in Example I was duplicated. The nematic liquid crystal composition utilized in the display of this Example consisted of MBBA combined with an additive choline chloride. The liquid crystal material was prepared by dissolving choline chloride in MBBA in an amount of $2.8 \times 10^{-7}$ mol/cm$^3$. The two materials were mixed and the choline chloride dissolved at room temperature. The resistivity was measured and found to be $.42 \times 10^9$ ohm-cm. The resultant display cell was placed in the same apparatus described in Example I and the frequency of the AC power source varied. Pictures of the curves traced on the oscilloscope were taken and appear as FIGS. 3A, 3B and 3C. As indicated, the device was operational at a frequency of 2 Hz and also up to 50 Hz, as indicated in FIG. 3B. A comparison of FIGS. 2B and 3B indicates that the addition of choline chloride additive to MBBA increased the operating frequency of the device by better than 10 times. As indicated in FIG. 3C, a frequency of 200 Hz was above the cut-off frequency of the device.

EXAMPLE III

Figure 4A:
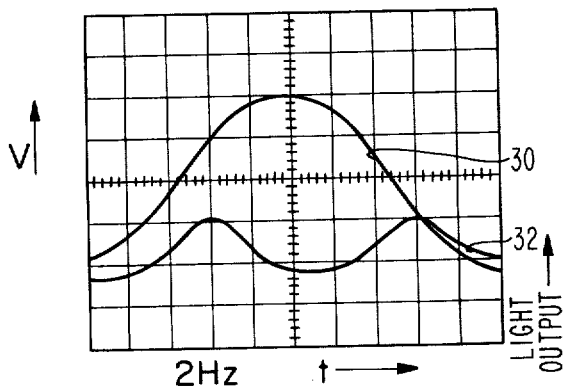
Figure 4B:
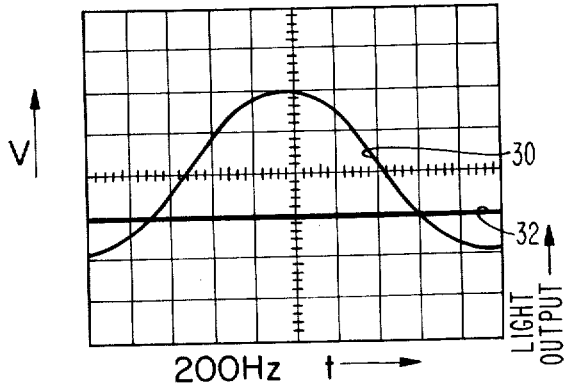
Figure 4C:
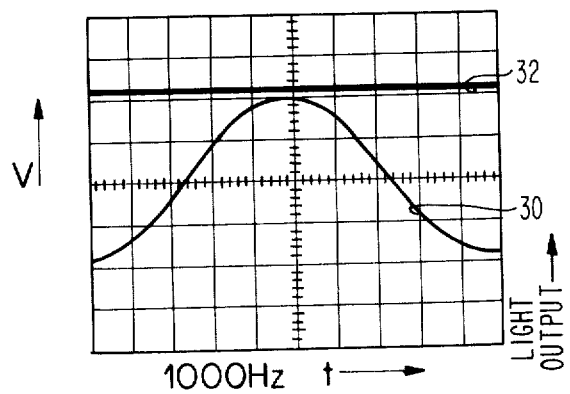

The same procedure described in Example I was used to fabricate the elements of another liquid crystal display cell. However, the liquid crystal composition used in the cell was a mixture of MBBA and dibenzyl-dimethyl ammonium chloride. The liquid crystal composition was made by dissolving dibenzyl-dimethyl ammonium chloride in MBBA at room temperature in an amount of $2.29 \times 10^{-6}$ mol/ml. The addition of the additive resulted in a liquid crystal composition resistivity of $.48 \times 10^9$ ohm-cm. FIGS. 4A–4C indicate clearly that the resultant device was operated successfully to provide good contrast when the frequency of the power source was 200 Hz. As indicated in FIG. 4C, 1,000 Hz was above the cut-off frequency.

EXAMPLE IV

The same procedure for fabricating and assembling the liquid crystal device described in Example I was followed, and the nematic liquid crystal composition introduced consists of MBBA and EBBA in equimolar quantities in which is dissolved $6.7 \times 10^{-6}$ mol/ml of dibenzyl dimethyl ammonium chloride. The cut-off frequency was 1,500 Hz.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A nematic liquid crystal composition having an increased frequency response comprising
   a nematic liquid crystal material with a negative dielectric anisotropy having dissolved therein an additive to provide electrical conductivity having the formula $(C_6H_5-CH_2)_2(R)_2N^+X^-$ wherein R is selected from the group consisting of methyl and ethyl, and $X^-$ is selected from the group consisting of $Cl^-$, $Br^-$, and $I^-$.

2. The nematic liquid crystal composition of claim 1 wherein said additive is present in said nematic liquid crystal material in the range of $0.56 \times 10^{-6}$ to $10.9 \times 10^{-6}$ mol/ml.

3. The nematic liquid crystal composition of claim 1 wherein said additive is dibenzyl-dimethyl ammonium chloride.

4. The nematic liquid crystal composition of claim 1 wherein said additive is dibenzyl-diethyl ammonium chloride.

5. The nematic liquid crystal composition of claim 1 wherein said nematic material is p-methoxybenzylidene p-butylaniline.

6. The nematic liquid crystal composition of claim 1 wherein said nematic material is a mixture of p-methoxy-benzylidene p-butylaniline and p-ethoxybenzylidene p-butylaniline.

7. An electro-optical display device comprising
   two parallel members, at least one of which is transparent, spaced apart from 10 to 100 microns,
   electrodes on the facing surfaces of said members,
   a nematic liquid crystal material interposed and filling the space between said electrodes having a resistivity in the range of $10^8$ to $5 \times 10^9$ ohm-cm., said nematic liquid crystal material having a threshold electrical field which when exerted causes scattering of incident light, said nematic liquid crystal material comprising a nematic material with a negative dielectric anisotropy having dissolved therein an additive to provide electrical conductivity having the formula $(R)_2(R_2)_2N^+X^-$ wherein R is a benzyl group, $R_2$ is selected from the group consisting of methyl and ethyl groups, and $X^-$ is selected from the group consisting of $Cl^-$, $Br^-$ and $I^-$, and
   means for applying an electric field across the nematic liquid crystal material through said electrodes that exceeds said threshold electric field.

8. The electro-optical device of claim 7 wherein said additive is present in said nematic liquid crystal material in the range of $0.56 \times 10^{-6}$ to $10.9 \times 10^{-6}$ mol/ml.

9. The electro-optical device of claim 7 wherein said additive is dibenzyl-dimethyl ammonium chloride.

10. The electro-optical device of claim 7 wherein said additive is dibenzyl-diethyl ammonium chloride.

11. The electro-optical device of claim 7 wherein said nematic material is p-methoxybenzylidene p-butylaniline.

12. A nematic liquid crystal composition having an increased frequency response comprising
    a nematic liquid crystal material with a negative dielectric anisotropy having dissolved therein choline chloride.

* * * * *